United States Patent Office 2,710,236
Patented June 7, 1955

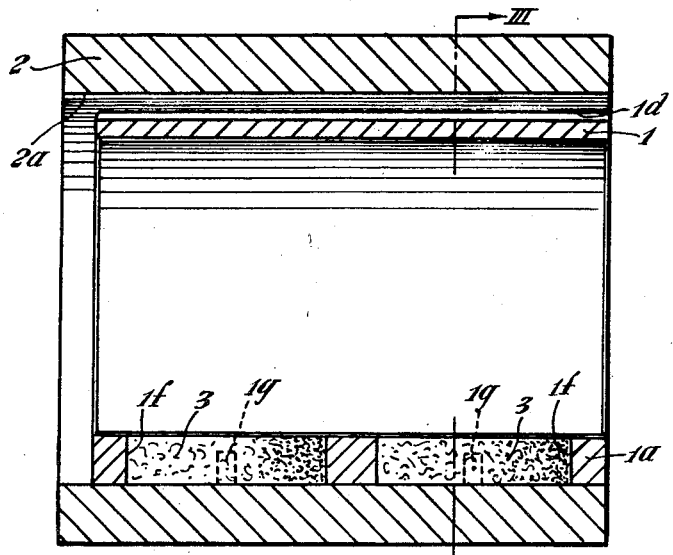
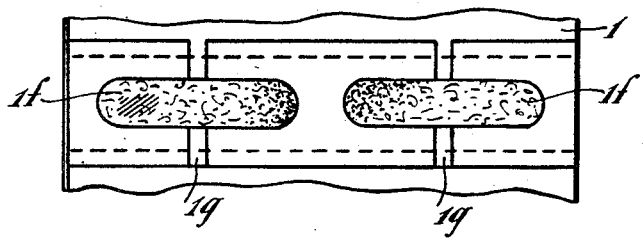
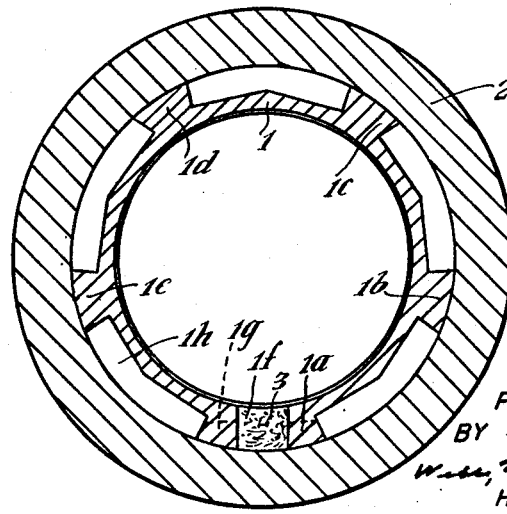

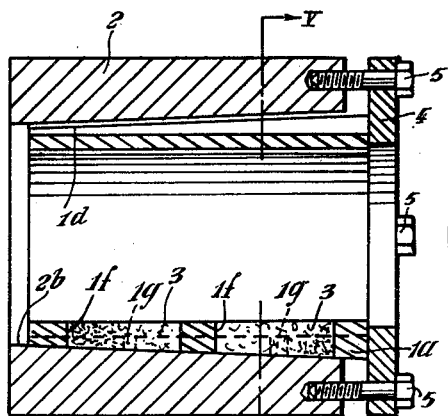
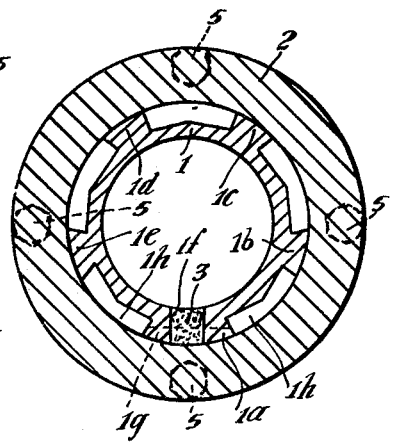
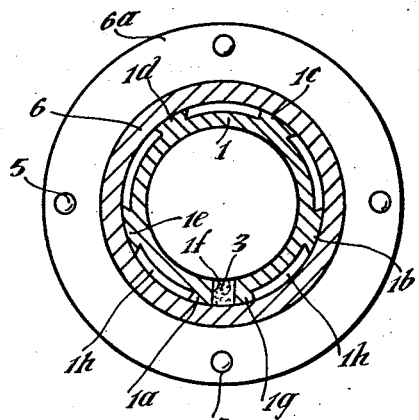
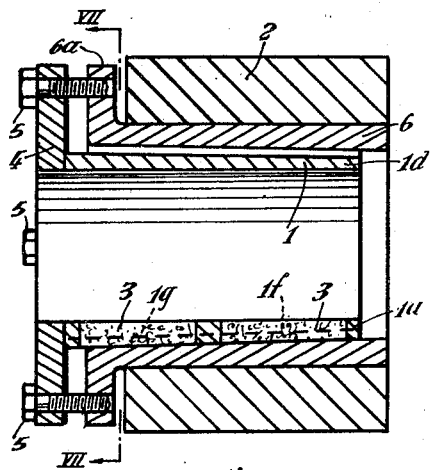

2,710,236

DEFORMABLE PLAIN BEARINGS AND BEARING ASSEMBLIES

Phil Prince Love, Wembley, England, assignor to The Glacier Metal Company Limited, Wembley, England, a British company Application January 4, 1952, Serial No. 264,936

Claims priority, application Great Britain January 10, 1951

2 Claims. (Cl. 308—70)

This invention relates to bearing assemblies, and is particularly concerned with improvements in cylindrical or taper bearings, such as spindle bearings for high precision machine tools, grinders, jig borers and the like where it is essential that the spindle should run with minimum clearance to ensure exact axial location, coupled with effective lubrication to avoid overheating at high speed and thereby to avoid errors due to expansion of the supporting housing.

The invention specifically relates to plain bearing assemblies of the kind comprising a bearing shell having external longitudinally extending ridge elements at at least three points around the circumference, and a housing adapted to exert compression on said ridge elements to effect deformation of the bearing shell to reduce clearance between bearing surface and journal at circumferentially spaced positions.

It has been found that with this type of bearing employing full fluid lubrication, the type of oil film that is built up by oil wedges causes the generation of excessive heat in the oil film by absorption of work therein, and it is important to avoid this when such a bearing is to be used in a precision machine tool or the like.

The present invention has for its object to provide an improved plain bearing for the purpose referred to whereby the formation of such smaller oil wedges is avoided so that the clearance between the bearing surface and a spindle running therein may be reduced to a minimum to secure precise axial location while maintaining conditions of lubrication which avoid the generation of excessive heat and yet are adequate to prevent metal-to-metal contact and to keep frictional drag at a low figure and, furthermore, to provide a simple, effective and inexpensive construction of bearing which is capable of being readily fitted and is highly efficient in use.

According to the present invention, a plain bearing assembly of the kind referred to, is characterized in that one at least of said ridge elements is of increased width, and a longitudinal slot or slots for the reception of a lubricating wick element or elements extends through the ridge element or elements of increased width to the bearing surface.

In a preferred embodiment, a slot or slots for the reception of a lubricating wick element or elements is or are provided to extend through a ridge element of increased width disposed at the bottom of the bearing in use, and a transverse passage or passages is or are provided whereby said slot or slots is or are placed in communication with adjacent circumferentially extending spaces between the bearing shell and the housing.

The bearing shell may be provided with ridge elements whose outer surfaces are parallel with the axis of the shell and adapted for insertion into a bearing housing having a cylindrical bore of such diameter as to exert deforming pressure on the ridge elements when the bearing is inserted axially into the housing or the housing is capable of being contracted to exert pressure on the said ridge elements.

Alternatively, the ridge elements or the ridge elements and the bearing shell may be of tapered formation to cooperate with a correspondingly tapered bore in the bearing housing, deforming pressure being exerted on the ridge elements by pressing the bearing shell axially into the said housing. This construction of bearing may be combined with a sleeve member having an internally tapered bore to receive the bearing shell and a cylindrical exterior for positioning in a conventional bearing housing so as to provide an easily fitted bearing assembly unit. A ring element or the equivalent and tightening screws may be provided for pressing the bearing shell axially into the sleeve or housing.

More specifically the invention includes a plain bearing assembly comprising a bearing housing or external sleeve member having a tapered bore, a bearing shell having at least three longitudinally extending external ridge elements( at least), the outer surface of said ridge elements being tapered to correspond with said bore, one of said ridge elements disposed lowermost in the assembly being of increased width, a longitudinally extending slot or slots extending through said ridge element of increased width to the bearing surface for the reception of a lubricating wick element or elements, and a transverse slot through said ridge element of increased width intersecting the, or each, longitudinal slot for establishing communication with adjacent circumferentially spaced, longitudinally extending spaces between the bearing shell and the housing or external sleeve. The ridge elements advantageously are of dove-tail or equivalent formation so as to be narrower at the junction thereof with the bearing shell than at their outer surfaces.

The invention is hereinafter described, by way of example, with reference to the accompanying diagrammatic drawings, in which—

Figure 1 is a longitudinal section illustrating one construction of a plain bearing assembly in accordance with the invention;

Figure 2 is a partial bottom plan view of the bearing shell shown in Figure 1;

Figure 3 is a section on the line III—III of Figure 1;

Figure 4 is a longitudinal section similar to Figure 1, but illustrating a modification;

Figure 5 is a section on the line V—V of Figure 4;

Figure 6 is a longitudinal section illustrating a further modification; and

Figure 7 is a section on the line VII—VII of Figure 6.

In carrying out the invention into effect according to one embodiment, and with reference more particularly to Figures 1 and 3 of the accompanying diagrammatic drawings, a cylindrical bearing shell 1 is provided with external longitudinally extending ridge elements 1a, 1b, 1c, 1d, and 1e, preferably five in number, equally spaced around the circumference. As shown more particularly in Figure 3, the said ridge elements are preferably formed as by milling so as to be of dove-tail or equivalent formation and so as to present a larger area of contact to a housing 2 with a narrow part at the junction with the bearing shell. The ridge element 1a, which is disposed lowermost, is of increased width and is provided with longitudinally disposed slots 1f extending therethrough for the reception of wick or like oil-metering means 3. The ridge element 1a also is provided with transverse passages 1g, which establish communication between the longitudinal slots 1f and the adjacent spaces 1h between the bearing shell 1 and the housing 2.

The bearing shell 1 is pressed axially into the bore 2a of the housing 2, said bore being of such reduced diameter that the resulting pressure on the ridge elements 1a, 1b, 1c, 1d, and 1e effects deformation of the bearing shell to reduce clearance at a corresponding number of positions between the bearing surface of the bearing shell and a spindle running therein. Alternatively, the bearing shell 1 may be inserted into a cylindrical bore in a split housing adapted to be contracted so as to exert the required deforming pressure on the said ridge elements.

In use, lubricant such as oil is supplied to the spaces 1h and is maintained at a level not above the top of the slots 1f. The lubricant passes through the transverse passages 1g to the wick or like metering means 3 whereby the lubricant is applied to the rubbing surfaces in an amount sufficient only to provide a tenuous oil film on the opposing faces with no excess liable to form oil wedges.

In the modification illustrated in Figures 4 and 5, the bearing shell 1 is provided with ridge elements 1a, 1b, 1c, 1d, and 1e thereon which are of externally tapered formation for coacting with a correspondingly tapered bore 2b in the housing 2 so that by pressing the bearing shell axially into the housing 2, the degree of deformation of the bearing shell may be adjusted as required. For the purpose of pressing the bearing shell 1 into the housing 2, a ring element 4 may be arranged to abut the outer end of the bearing shell and may be drawn towards the housing 2 by means of tightening screws 5. The bearing shell in this modification is otherwise constructed as shown in Figures 1 to 3, the bottom ridge element 1a being provided with the longitudinal slots 1f and the transverse passages 1g for conducting lubricant to the wick or like metering means 3.

In a further modification, as illustrated in Figures 6 and 7, a plain bearing assembly unit comprises a bearing shell 1 having externally tapered ridge elements 1a, 1b, 1c, 1d, and 1e as in the previous embodiment, and an external sleeve member or housing 6 having a correspondingly tapered bore to receive the bearing shell which may be pressed axially into the said sleeve member 6 as by means of a ring element 4 and tightening screws 5 engaging screw-threaded holes in a flanged part 6a of the sleeve member 6. The sleeve member 6 is cylindrical externally so that it may be readily fitted into a cylindrical bore in a conventional housing 2. The bearing shell is provided with a bottom ridge element 1a of increased width to accommodate the slots 1f containing the wick or like element 3, the transverse passages 1g in this case establishing communication with spaces 1h between the bearing shell and the sleeve member 6.

While the invention has been described and illustrated in its particular application to bearings for use with cylindrical journals, the invention is equally applicable in connection with bearings or bearing assemblies in which the bearing is provided with a tapered bore to receive a correspondingly tapered journal.

It will be understood that the invention is not limited to the particular embodiments hereinbefore described. For example, the bearing shell may consist of a bushing, for example, of lead bronze, Babbitt or aluminum alloy, or may be in the form of a bi-metallic sleeve in which a lining of soft metal or metal alloy is bonded to a stronger backing material. In all embodiments, the bearing shell may have a cylindrical or tapered bore.

I claim:

1. A plain bearing assembly comprising a housing, a deformable bearing shell having a bearing surface and external, longitudinally extending, circumferentially spaced ridge elements at at least three points around its circumference, said ridge elements contacting said housing and being spaced from each other circumferentially a distance great enough so that when pressure is applied to said ridges by said housing the shape of the bearing surface of said bearing shell is changed to provide areas of minimum clearance between the bearing surface and a journal at circumferentially spaced positions separated by areas of greater clearance, said areas of minimum clearance corresponding to said ridge elements, at least one of said ridge elements being provided with a longitudinal slot extending through it to the bearing surface for the reception of a lubricating wick element for metering oil to the bearing surface at an area of minimum clearance to maintain a tenuous film of oil on the journal without supplying excess oil liable to form oil wedges in said areas of greater clearance.

2. A plain bearing assembly comprising a housing, a deformable bearing shell having a bearing surface and external, longitudinally extending, circumferentially spaced ridge elements at at least three points around its circumference, said ridge elements contacting said housing and being spaced from each other circumferentially a distance great enough so that when pressure is applied to said ridges by said housing the shape of the bearing surface of said bearing shell is changed to provide areas of minimum clearance between the bearing surface and a journal at circumferentially spaced positions separated by areas of greater clearance, said areas of minimum clearance corresponding to said ridge elements, one of said ridge elements disposed at the bottom of the bearing assembly being provided with a longitudinal slot for the reception of a lubricating wick element for metering oil to the bearing surface at an area of minimum clearance to maintain a tenuous film of oil on the journal without supplying excess oil liable to form oil wedges in said areas of greater clearance, said ridge element disposed at the bottom of the bearing assembly being provided with a transverse passage placing said longitudinal slot in communication with a space between the bearing shell and the housing.

References Cited in the file of this patent

UNITED STATES PATENTS

| Number | Name | Date |
| --- | --- | --- |
| 1,149,299 | Shearer | Aug. 10, 1915 |
| 1,340,102 | Ayres | May 11, 1920 |
| 1,362,619 | Hall | Dec. 21, 1920 |
| 1,371,666 | Close | Mar. 15, 1921 |